United States Patent [19]
Kawai et al.

[11] 3,890,734
[45] June 24, 1975

[54] AUTOMATIC FISHING APPARATUS

[75] Inventors: Taneichi Kawai, Anjo; Koji Nishida, Chiryu, both of Japan

[73] Assignee: Aisin Seiki Kabushiki Kaisha, Kariya-shi, Japan

[22] Filed: Dec. 20, 1973

[21] Appl. No.: 426,961

[30] Foreign Application Priority Data
Dec. 22, 1972  Japan.................................. 48-674

[52] U.S. Cl........................................... 43/4; 43/15
[51] Int. Cl............................................. A01k 97/00
[58] Field of Search ............ 43/44.88, 26.1, 25, 24, 43/21.2, 19, 18, 6.5, 15, 4; 338/68, 2; 91/31, 6

[56] References Cited
UNITED STATES PATENTS
3,710,499   1/1973   Tadano................................. 43/15

*Primary Examiner*—Louis G. Mancene
*Assistant Examiner*—Peter Skiff
*Attorney, Agent, or Firm*—Frank J. Jordan

[57] ABSTRACT

An automatic fishing apparatus having a rolling compensating mechanism and a fishing rod angle correcting device. The fishing apparatus is controlled by means of a potentiometer for detecting the ship's rolling angle and a potentiometer for detecting the fishing rod's rotational angle.

14 Claims, 8 Drawing Figures

AUTOMATIC FISHING APPARATUS

FIELD OF THE INVENTION

This invention relates an automatic fishing apparatus and more particularly to an automatic fishing apparatus provided with a rolling compensating mechanism and a fishing rod angle correcting device.

SUMMARY OF THE INVENTION

An important object of the invention is to provide a simple, efficient and compact fishing apparatus provided with a rolling comensating mechanism and fishing rod angle correcting device. According to the characteristics of the present invention, a novel and improved automatic fishing apparatus is provided, which apparatus is controlled by means of a potentiometer for detecting the ship's rolling angle and a potentiometer for detecting the fishing rod's rotational angle.

OBJECTS OF THE INVENTION

One object of this invention is to provide a simple, efficient, compact fishing apparatus.

Another object of the present invention is to provide an automatic fishing apparatus having with a compensating mechanism for the rolling of the ship and a correcting device of fishing rod angle.

Still another object of the invention is to provide a useful fishing apparatus having a rolling compensating mechanism and a fishing rod angle correcting device operatively connected to the rolling mechanism in order to keep a distance between the rod's top and the sea.

BRIEF DESCRIPTION OF DRAWINGS

The foregoing and other features will appear more apparent from the accompanying drawings wherein like numerals refer to like parts and wherein.

DETAILED EXPLANATION OF PREFERRED EMBODIMENT

Figure 1:
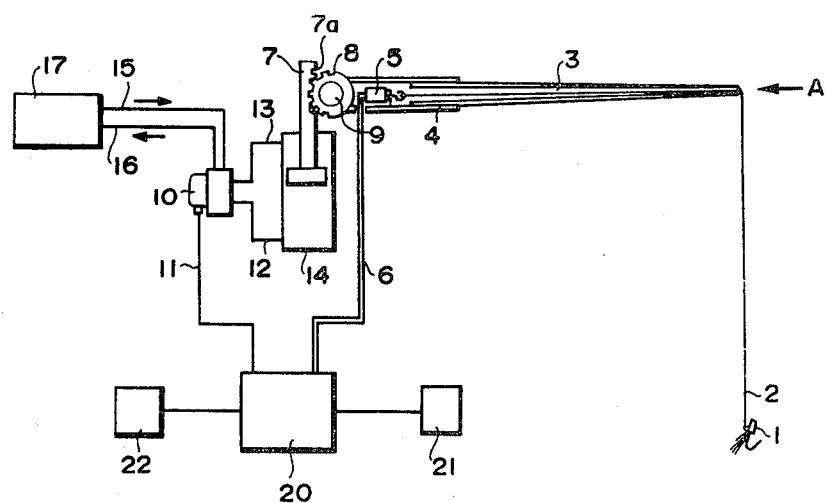
FIG. 1 shows a general elevational view of an embodiment of the automatic fishing apparatus provided with a rolling compensating mechanism and a fishing rod correcting device.

Referring to the drawings by reference characters, the numeral 1 in FIG. 1 designates a fish hook, 2 is a fishing line, 3 is a fishing rod, 4 is a holder for supporting the rod, 5 is a detector for determining the weight of a fish 1 and 6 are lead wires of the detector. On the end portion of a piston 7, there is provided a rack 7a. The rack 7a engages a gear 8 in order to change the vertical movement of the piston 7 into a rotating motion of the gear 8.

The gear 8 is integrally connected to a shaft 9, so as to rotate the shaft 9. The holder 4 is integrally connected to the shaft 9. In accordance with the electric signals carried on a wire or conductor 11, a conventional servo valve or electrically actuated-oil pressure controller 10 controls the oil pressure.

Oil pressure is led from a pump unit 17 to the servo valve 10 through an oil supply conduit 15 and an oil return conduit 16. The oil pressure is supplied to the lower portion of a cylinder 14 through an oil conduit 12 and to the upper portion through an oil conduit 13. The oil conduit 15 is connected with the conduit 13 through the servo valve 10 and also the conduit 16 is connected with the conduit 12 through the valve 10. Therefore, in accordance with the electricity carried by the wire 11, the servo valve 10 is actuated to reduce the section of the conduit portion connecting the oil conduits 13 and 15 with each other and the section of the conduit portion between the oil conduits 12 and 16 with each other, in order to lower the piston 7. Consequently, the moving speed of the piston 7 is determined according to the value of the electricity carried by to the wire 11. When the direction of the electricity is changed, the oil conduit 12 is connected with the conduit 15 and the oil conduit 13 is connected with the conduit 16 so as to raise the piston 7. Signals from the detector 5, signals from a potentiometer 21 for detecting the rolling of the ship and signals from a potentiometer 21 for detecting the angle of the fishing rod 3 are supplied to an electronic controlling circuit 20. As a result, a resulting signal is issued from the electronic controlling circuit 20 to the servo valve 10 in order to control the piston 7 and accordingly, the angle of the fishing rod 3.

Figure 2:
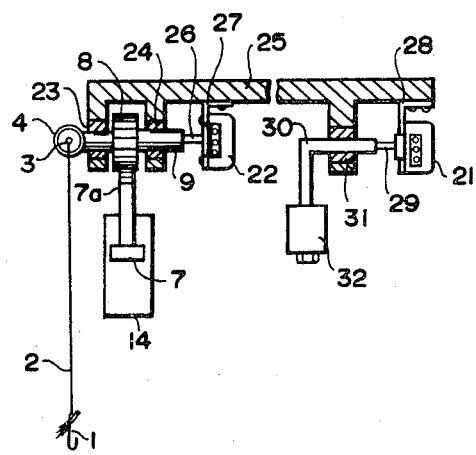
FIG. 2 shows a sectional view of the main portion of the automatic fishing apparatus taken along arrow in FIG. 1 to clearly show the relationship of the various parts.

As apparent from the drawing of FIG. 2 showing the front view of the mechanism of FIG. 1, the shaft 9 is rotationally mounted on a fishing mechanism frame 25 through bearings 23, 24 and the shaft 9 is made integral with a rotating shaft 26 of the potentiometer 22 for detecting the angle of the fishing rod, so that the fishing rod angle is detected through the resistance of the potentiometer 22. The potentiometer is attached to the fishing mechanism frame 25 through a stay 27. The potentiometer 21 for detecting the rolling motion of the ship also is mounted on the fishing mechanism frame 25 through a stay 28 and a shaft 29 of the potentiometer 21 is integrally connected to a shaft 30 which is rotatably supported from the frame 25 by means of a bearing 31. A weight 32 integrally connected to the shaft 30 maintains itself in its depending condition independently of the various rolling conditions of the ship and of the fishing mechanism frame 25. Thus, the resistance of the potentiometer 21 for detecting the rolling, which resistance is determined according to the rolling angle of ship, is indicated.

Figure 3:
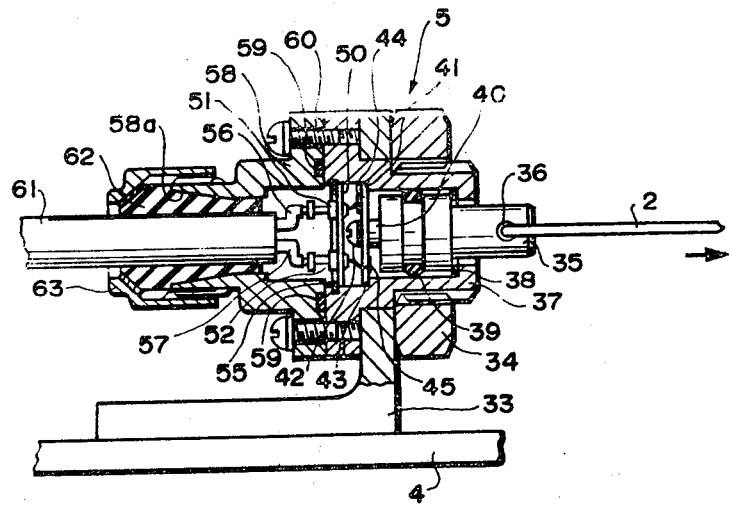
FIG. 3 is an enlarged sectional view of a detector.
Figure 4:
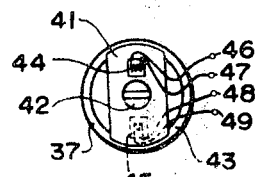
FIG. 4 shows operational parts of the detector.

The construction of the detector 5 will be explained in detail with reference to FIG. 3. The detector 5 is mounted within the holder 4 by means of a stay 33 and a nut 34. The fishing line 2 is tied to an opening 36 formed at the end portion of a piston 35. The cylinder 37 is protected from entering of dust and water by means of a seal ring 38 and an O-ring 39 of the piston 35. An extrusion or projection 40 is formed at the left end of the piston 35 and a gauge plate 41 is fixed to the projection 40 by a screw 42. A gauge plate 41 is butted to a stepped portion 43 of the cylinder 37 as shown in FIG. 4. Two strain gauges 44 and 45 are attached or glued on the front and rear faces of the gauge plate 41. To the strain gauges, lead lines 46, 47, 48 and 49 are attached and the other ends of these lead lines are soldered to four terminals 51, 52, 53 and 54 on the terminal plate 50. Terminals 53 and 54 are not shown in the drawing. This plate is kept from withdrawing by means of a stop ring 55. Out-put leads 56 and 57 are attached to the previously mentioned four terminals 51, 52, 53 and 54 in order to withdraw the gauge output. The cylinder 37 and a cover 58 are connected to each other by means of a screw 60. As shown in FIG. 3, a seal 59 is situated between the cylinder 37 and the cover 58. A sheath 61 for the leads is sealed in a waterproof manner by a bushing 62. A tapered portion 58a of the cover 58 firmly contacts the bushing 62 by means of a seal cap 63.

The operation of the detector 5 will be set forth in the following explanation.

Assuming that a pulling force is applied to the fishing line 2 in the direction indicated by the arrow shown in FIG. 3, it will be understood that the gauge plate 4 will be pulled against the projection 40 and changes its shape into an arch in cross section. The degree of deformation of the gauge plate 41 is detected by means of the conventional strain gauges 44 and 45. When the gauge plate is pulled in the direction of the arrow indicated in FIG. 3, the shape of plate 41 is so changed as to contract the strain gauge 44 and elongate the strain gauge 45. In order to compensate the alteration of output of the strain gauges 44 and 45 due to a thermal change and also obtain a bigger output, two strain gauges 44 and 45 are employed.

According to known prior art automatic fishing devices, micro-switches usually are used as detectors and they are exposed to the open air. As a result, on a voyage, salt is apt to be deposited on the movable portion of the micro switch and accordingly, the load set for actuating the micro switch is changed. Thus, when a fish bites the micro switch often does not actuate. Also, it is very difficult to set the actuating load of the micro switch with a small magnitude of load and change the setting load for actuating the micro switch according to the size of fish on a voyage.

The present invention deals with the foregoing problems in a novel and facile way.

According to the present invention, the automatic fishing apparatus uses a non-contact type detecting device such as the detector 5 for determining the size of the biting fish having the structure mentioned above and with a small number of movable members.

Figure 5:
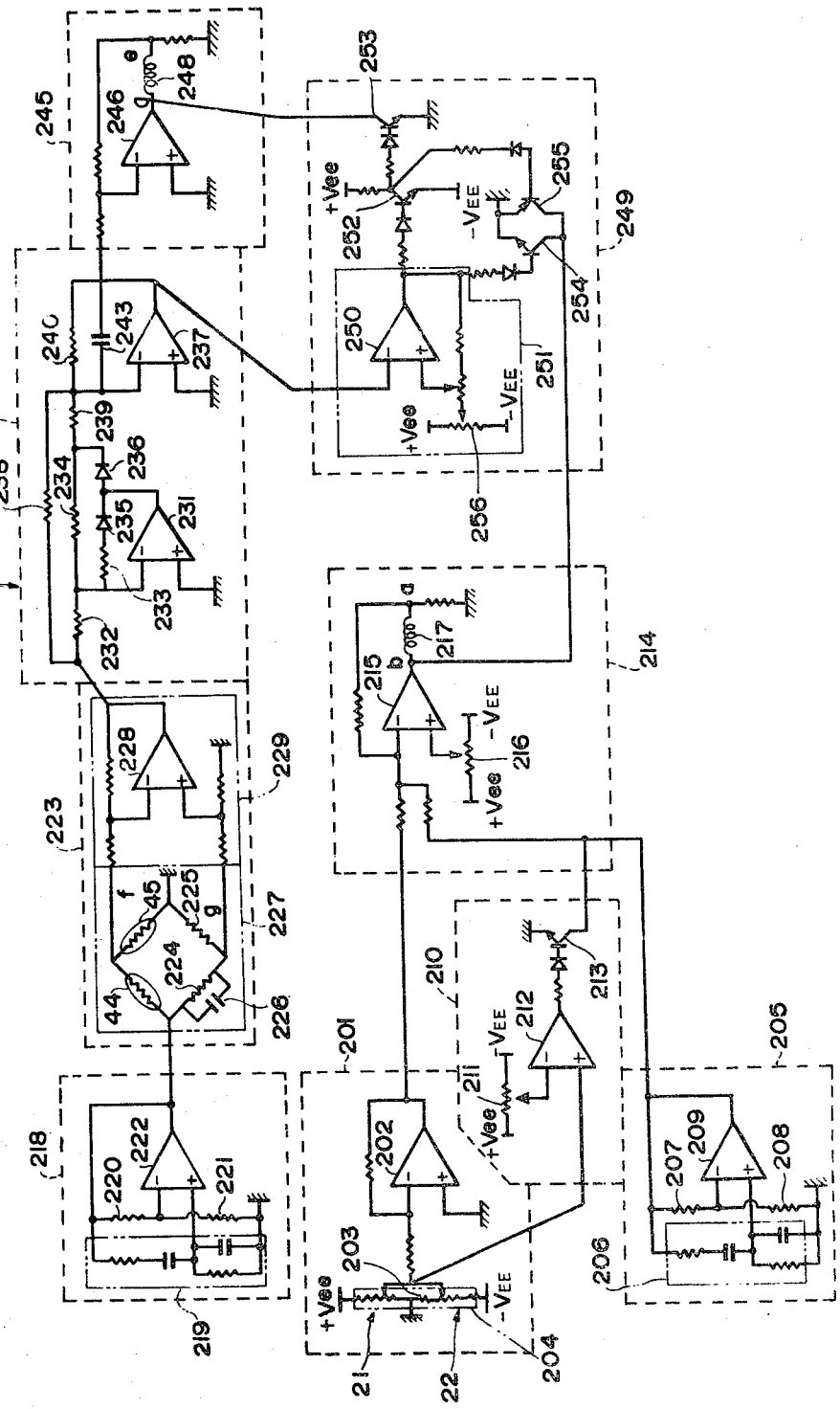
FIG. 5 is a block diagram of an electronic control circuit, and FIGS. 6, 7 and 8 indicate the relationship between a ship and a fishing rod.

The electronic controlling circuit 20 will be disclosed with reference to FIG. 5.

Figures 6, 7, 8:
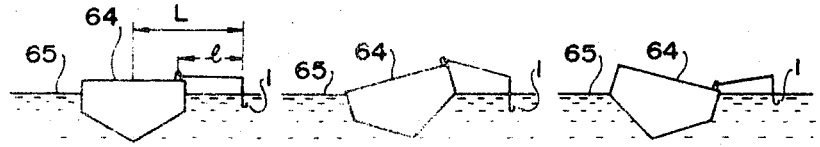

A rolling-rod levels comparing amplifier 201 has the function of comparing the output voltages of the potentiometer 21 for detecting the list of the ship owing to a rolling motion of the ship and of the potentiometer 22 for detecting the rotational angle of the fishing rod. The differential voltage between the two outputs is then amplified by means of an inversion operational circuit having an operational amplifier 202. The output voltage of the rolling detecting potentiometer 21 is standard when the ship 64 is floating on the water in a level condition as shown in FIG. 6. The output voltage of the rolling detecting potentiometer 21 is set for example, so as to lower when the ship is situated in the condition as shown in FIG. 7 and to raise when the ship is positioned at the condition as shown in FIG. 8. The output voltage of the potentiometer 22 for detecting the rod angle is set so as to go down when the rod 3 is raised and to raise when the rod is lowered. Consequently, the compensating magnitude of the rod angle for a variation in the angle of roll $\theta$ is set larger by an angle equal to $L/1\ \theta$ where L is the distance from the center of the ship to the end of the fishing rod 3 as shown in FIG. 6, 1 is the length of the fishing rod, and $\theta$ is the angle of roll of the ship. As a result, it is necessary to rotate the shaft 26 of the potentiometer 22 for detecting the rod angle larger than the angle of roll $\theta$ by L/1 times. When the resistances of the potentiometers 21 and 22 are equal, resistors 203 and 204 are positioned at the both sides of the potentiometer 22 for detecting the rod angle and the voltage variation of the potentiometer 21 is set larger than the variation of the potentiometer 22 by L/1 times.

There is provided a dandle oscillator 205 as a sine wave oscillator having a conventional wien bridge circuit and consisting of a CR circuit portion 206 for determining the frequency resistors 207 and 208 for determining magnitude of the frequency, and an operational amplifier 209. The sine wave output generated from the dandle oscillator 205 is used as a signal of the dandle oscillator.

A dandle signal controller 210 has a voltage comparator circuit and makes a comparison between the voltage of an inversion input terminal (not shown) of an operational amplifier 212 which is supplied through a volume control 211 and the differential voltage between the voltages of the potentiometer 21 for detecting rolling and of the potentiometer 22 for detecting rod angle. When the differential voltage is higher than the inversion input terminal voltage, a transistor 213 is turned ON and on the other side the output signal of the dandle oscillator is cut. When the differential voltage is lower than the inversion input terminal voltage, the transistor 213 is turned OFF and the output signal of the dandle oscillator is not cut. As a result, the fishing rod 3 is raised so as to raise the differential output between the output of potentiometer 21 for detecting rolling and that of potentiometer 22 for detecting rod angle, so that the fishing rod does not carry out its dandle oscillating motion.

A rolling dandle signal generator 214 consists of a differential input voltage current convertor having an operational amplifier 215 in order to supply current to a control coil 217 of the servo valve 10 in response to the input signals of the rolling-rod level comparison amplifier 201, the dandle oscillator 205 and a volume control 216 for standard angle of rod. The control of the rod level through the control coil 217 of the servo valve 10 will be explained in detail. When current flows in the the direction $a \rightarrow b$, the servo valve 10 is driven to lower the piston in the cylinder 14 and to raise the fishing rod level. On the other side, when a current flows in the direction $b \rightarrow a$, the piston in the cylinder 14 is raised to lower the rod level.

Now the rod level control in response to the signal of the rolling-rod level comparison amplifier 201 will be considered. When the ship 64 lists as shown in FIG. 7, the output voltage of the potentiometer 21 for detecting rolling is lowered. Accordingly, the current corresponding to the variation of the output voltage flows to the control coil 217 of the servo valve 10 in the direction b   a, so as to lower the rod level and also the output voltage of the potentiometer 22 for detecting the rod angle. When the variation of the out-put voltage becomes zero, the coil current is made zero and the rotational movement of fishing rod 3 is halted. Thus, the tilting angle of fishing rod 3 owing to the rolling motion of the ship is controlled in order to keep the distance between the water level and the hook 1 constant.

Next, the controlling of the fishing rod level in response to the signal of the dandle oscillator 205 will be considered. In response to the sine wave signal of zero standard dispatched from the dandle oscillator 205, a current is alternatively passed in the directions $a \rightarrow b$ and $b \rightarrow a$ to the control coil 217 of the servo valve 10 mounted on the rolling dandle signal generator 214 in order to raise and lower the fishing. As for the control of rod level through the standard rod angle volume control 216, when the output voltage of volume control 216 is increased, a current flows in the direction $b \rightarrow a$ into the control coil 217 of the servo valve 10 in order to raise the rod level. The variation of voltage of the potentiometer 22 for detecting the rod angle due to the increase or raising of the rod level is offset to the variation of the output voltage of the volume control 216 for controlling the angle of the rod, so as to make the coil current zero and to put a stop to the rod 3. The volume control 216 freely controls the level of the fishing rod. An oscillator 218 for a bridge source is a sine wave oscillator circuit having a known prior art wien bridge circuit and consists of a CR circuit portion 219 for determining the frequency, resistances 220, 221 for determining amplitude, and an operational amplifier 222. The sine wave output is sent to a bridge circuit for changing the resistance variation of the strain gauges 44 and 45 mounted in the detector 5 into a voltage variation.

A bridge amplifier 223 consists of a bridge circuit 227 and a differential amplifier circuit 229. The bridge circuit 227 includes the strain gauges 44 and 45, resistors 224 and 225 and a condenser 226. The differential amplifier 229 includes an operational amplifier 228 for amplifying the output voltage of the bridge circuit 227. The strain gauges 44 and 45 of the detector 5 in the bridge circuit 227 function as resistors. The condensor 226 is adapted to control the phase in order to provide zero balance of the bridge and in this case the condenser 226 amplifys the output of the bridge.

A rectifying amplifier 230 rectifies and amplifies the AC strain output of the bridge amplifier 223 in order to change the strain into a DC strain output corresponding to the degree of the strain. The rectifying amplifier 230 consists of an operational amplifier 231, resistors 232, 233 and 234, diodes 235 and 236, an operational amplifier 237, resistors 238, 239 and 240, and a capacitor 243. A raising-up signal is produced in a full-wave rectification circuit 245 which constitutes a voltage current converter circuit including an operational amplifier 246. Thus, current is flows to a control coil 248 of the servo valve 10, the magnitude of the current being determined in accordance with the strain output voltage issued from the rectifying amplifier 230. When a current flows to the control coil 248 in the direction d e, the servo valve 10 operates to lower the piston within the cylinder 14 in order to raise the fishing rod 3. When the degree of the strain output of the rectifying amplifier 230 is lower than that of the detected level for the fishing-up or pulling in operation, the servo valve 10 is controlled by only the rolling dandle signal generator 214, and when the strain output of the rectifying amplifier 230 is higher than the detecting level, the valve 10 is controlled by only the fishing-up signal generator 245. A fishing-up level detector 249 exchanges the signal generators from the rolling dandle signal generator 214 to the fishing-up signal generator 245. The words "detecting level" means a predetermined level or degree for determing the exchanging time according to the degree of strain output. The fishing-up level detector 249 consists of a voltage comparing circuit 251 including an operational amplifier 250, a transistor 252 for inverting output, another transistor 253 for ON-OFF control of the output of the fishing-up signal generator 245, and still other transistors 254 and 255 for ON-OFF, control of the output of the rolling dandle signal generator 214. The detecting level is set by a volume control 256. When the strain output voltage issued from the rectifying amplifier 230 is higher than that of the non-inverted input terminals (not shown) of the operational amplifier 250, the voltage of the non-inverted input terminals being determined in accordance with the detecting level, the output voltage of the operational amplifier 250 becomes a minus saturation voltage, the transistors 254 and 255 turn OFF, the transistor 253 turns ON, and the output of the fishing-up signal generator 245 is cut. Thus the level of the fishing rod is controlled by the signals issued from the rolling dandle signal generator 214. On the contrary, when the strain output voltage issued from the rectifying amplifier 230 is lower than that of the non-inverted input terminals, the output voltage of the operational amplifier 250 becomes a plus saturation voltage, thus the control of the fishing rod level is obtained in response to the signals of the fishing-up signal generator 245.

The general operation of the electronic controlling circuit 20 will be apparent from the following detail description.

When the fishing hook has no-load, the output signal level of the rectifying amplifier 230 becomes zero which is higher than the detecting level of the fishing level detector 249. Consequently, the output signal issued from the fishing-up signal generator 245 is cut and the fishing rod 3 is driven in response to only the output signal of the rolling dandle signal generator 214. When the ship 64 is inclined as shown in FIG. 7 owing to a rolling motion thereof, the output voltage of the potentiometer 21 for detecting the rolling motion falls. The variation of voltage is amplified by the operational amplifier 202 contained in the rolling-fishing rod level comparing amplifier 201 and changed into an electric current by the operational amplifier 215 of the rolling dandle signal generator 214. Then, the variation flows in the terms of electricity in the direction $b \rightarrow a$ to the control coil 217 of the servo valve 10. Owing to the current, a valve (not shown) of the servo valve 10 is opened to raise the piston in the cylinder 14 and lower the fishing rod until the variation of voltage of the rolling detecting potentiometer 21 is balanced with the variation of voltage of the potentiometer 22. As a result, the level of the fishing rod is always kept at the fixed altitude from the sea level 65 as shown in FIGS. 6, 7 and 8 in spite of the rolling condition of the ship. Owing to a sine wave signal of zero standard issued from the dandle oscillator 205, a current alternatively flows in the direction $a \rightarrow b$ and $b \rightarrow a$ to the controlling coil 217 of the servo valve 10 in order to effect up and down operation the level of the fishing rod. When an output is supplied to the oscillator 205 to raise the level of the fishing rod, a difference between output voltages of the potentiometer 21 for detecting rolling motion and of the potentiometer 22 for detecting rod-angle is raised and reached at the predetermined degree determined by the volume control 211 of the dandle signal controller 210, the transistor 213 turns ON in order to cut the sine wave signal and stop the dandling motion of the fishing rod 3.

When a load is applied to the fishing rod 1, the resistances of the strain gauges 44 and 45 contained in the detector 5 are varied and the electric bridge is made unbalanced in order to generate a voltage between the output terminals $f$ and $g$ of the bridge circuit 227. The output signal is amplified in the bridge amplifier 223 and rectified to convert into a direct current by means of the rectifying amplifier 230. The direct current is finally amplified to generate a strain output. When the strain output issued from the rectifying amplifier 230 is raised over the detected level of the fishing-up of level detector 249, the output of the rolling dandle signal generator 214 is cut. Therefore, the fishing rod 3 is raised or operated in response to only the output signal of the fishing-up signal generator 245. During the operation of fishing-up, an electric current corresponding to the degree of strain output flows to the control coil 248 of the servo valve 10. When the fishing-up level detector 249 for detecting the moment of the strain output is lowered under the detected level owing to the loadless condition of the fishing rod, the fishing rod 3 is automatically returned to its level of loadless condition in response to the output signal of the rolling dandle signal generator 214.

It is to be understood that the automatic fishing apparatus of the invention is controlled by means of the potentiometer for detecting the ship's rolling angle and the potentiometer for detecting the fishing rod's rotational angle and the output signals of them. The rotational ratio of the potentiometers is adapted to be changed according to the width of ship, so that the rolling motion of the ship is easily compensated. The angle of the fishing rod is set freely by designating the volume corresponding to the relative angle between the directions of the fishing rod and the depending weight by means of the volume control for standard fishing rod angle installed in the electronical control circuit.

Whereas, the present invention have been shown and described in a particular form, it will be understood that further modifications may be considered so as come within the scope of the appended claims. For example, while the angle of the fishing rod is adapted to be continuously controlled by means of a volume, the angle is controlled stepwise by a change-over switch and fixed resistor. The angles of rolling and of the fishing rod may be detected digitally by using potentiometers in order to compensate step-wise the rolling angle.

What is claimed is:

1. A device for detecting the pulling force on a fishing line when caused by a fish being hooked on the fishing line, comprising a housing, an element disposed in said housing and connected to said fishing line, said element being subjected to the pulling force of said fishing line, strain gauge means mounted on said element for detecting the strain of said element to thereby detect the pulling force on said fishing line, and sealing means sealing the inside of said housing containing said element and strain gauge means from the outside environment.

2. Automatic fishing apparatus for use on a ship or the like comprising a fishing rod pivotally mounted on said ship, means for rotationally raising and lowering said fishing rod, a roll detecting means for detecting the angle of roll of the ship, said roll detecting means including a first potentiometer and a freely rotational weight suspended from a pivotal axis, said potentiometer being actuated by the relative pivotal movement between the ship and said suspended weight, a rod detecting means for detecting the rotational angle of said fishing rod, operable means operatively connected to both of said detecting means for producing signals corresponding to the difference between the angle of roll of the ship and the angle of the fishing rod as determined by both of said detecting means, and actuating means for rotating said fishing rod in response to said differences in angle between the roll of the ship and the fishing rod to thereby maintain said fishing rod in a desired predetermined position.

3. Automatic fishing apparatus according to claim 2 including manually operable means operatively connected with said actuating means for setting said desired predetermined position at which said fishing rod is maintained.

4. Automatic fishing apparatus according to claim 2 wherein said rod detecting means includes a second potentiometer actuated by the relative pivotal movement between said pivotally mounted fishing rod and said ship.

5. Automatic fishing apparatus according to claim 4 wherein said operable means comprises a comparing amplifier means for comparing the output voltages of said potentiometers, and control means providing for compensation of the pivotal movement of said fishing rod for variations in the angle of roll $\theta$ of said ship by an amount equal to L/1 where $\theta$ is the angle of roll of the ship, L is the distance from the center of the ship to the end of said fishing rod, and 1 is the length of said fishing rod, whereby the end of said fishing rod is maintained at a constant elevation independently of the rolling motion of the ship.

6. Automatic fishing apparatus according to claim 4 wherein said actuating means rotates said fishing rod in response to the variation in voltage of said first potentiometer relative to the voltage of said second potentiometer.

7. Automatic fishing apparatus according to claim 6 wherein said actuating means includes an electrical coil, power means controlled by said electrical coil for rotating said fishing rod, comparing amplifier means for comparing the output voltages of said potentiometers, a dandle oscillator in the form of a sine wave oscillator and operable in conjunction with a dandle signal controller and a rolling dandle signal generator for controlling current to said electrical coil, whereby current passing through said electrical coil in one direction pivots said fishing rod in one direction and current passing through said electrical coil in another direction pivots said fishing rod in an opposite direction.

8. Automatic fishing apparatus for use on a ship or the like comprising a fishing rod pivotally mounted on said ship, a fishing line carried by said fishing rod, a line detecting means for detecting the pulling force on said fishing line when caused by a fish being hooked on said fishing line, said line detecting means comprising an element operably connected to said fishing line and subjected to the pulling force of said fishing line and strain gauge means mounted on said element to thereby detect the pulling force on said fishing line, means for rotationally raising and lowering said fishing rod, a roll detecting means for detecting the angle of roll of the ship, a rod detecting means for detecting the rotational angle of said fishing rod, operable means operatively connected to both of said detecting means for producing signals corresponding to the difference between the angle of roll of the ship and the angle of the fishing rod as determined by both of said detecting means, and actuating means for rotating said fishing rod in response to said difference in angle between the roll of the ship and the fishing rod to thereby maintain said fishing rod in a desired predetermined position.

9. Automatic fishing apparatus according to claim 8 wherein said element includes a gauge plate, and said strain gauge means includes strain gauges mounted on said plate.

10. Automatic fishing apparatus according to claim 8 wherein there are at least two strain gauges with at least one strain gauge being mounted on each side of said gauge plate.

11. Automatic fishing apparatus according to claim 8 wherein said line detecting means includes a housing, said element being disposed in said housing with the outer edge of said element abutting a corresponding portion of said housing, said element being a gauge plate having a generally central portion secured to said fishing line, whereby a pulling force on said fishing line causes said gauge plate to deflect.

12. Automatic fishing apparatus according to claim 8 wherein said element and said strain gauge means are mounted in a housing, and means sealing the inside of said housing from the outside environment.

13. Automatic fishing apparatus according to claim 8 wherein said line detecting means includes a line detecting circuit means for producing a signal when said fishing line is subjected to a pulling force represented by a fish being hooked on said fishing line, said line detecting circuit means including a bridge circuit, said strain gauge means including strain gauges incorporated in said bridge circuit.

14. Automatic fishing apparatus according to claim 13 further comprising oscillator means providing a sine wave output to said bridge circuit, a rectifying amplifier means operable to change the output from said bridge circuit from AC to DC, and a full-wave rectification circuit means which includes an electrical coil in which the current flowing therein is determined in accordance with the output voltage from said rectifying amplifier means representing the strain on said fishing line, and power means controlled by said electrical coil for rotating said fishing rod.

* * * * *